US009563874B1

United States Patent
McPhie et al.

(10) Patent No.: US 9,563,874 B1
(45) Date of Patent: Feb. 7, 2017

(54) RULE-BASED CONTENT FILTER

(75) Inventors: Jonathan McPhie, Mountain View, CA (US); Dan Fredinburg, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 594 days.

(21) Appl. No.: 13/523,377

(22) Filed: Jun. 14, 2012

(51) Int. Cl.
*G06F 15/16* (2006.01)
*G06Q 10/10* (2012.01)

(52) U.S. Cl.
CPC .................................... *G06Q 10/10* (2013.01)

(58) Field of Classification Search
CPC .... G06Q 10/10; H04L 29/06; H04L 29/08072
USPC ........................................................ 709/204
See application file for complete search history.

(56) References Cited

U.S. PATENT DOCUMENTS

| 8,065,313 | B2 | 11/2011 | Yagnik | |
|---|---|---|---|---|
| 8,098,934 | B2 | 1/2012 | Vincent et al. | |
| 8,234,168 | B1* | 7/2012 | Ruiz et al. | 705/14.64 |
| 2004/0215660 | A1* | 10/2004 | Ikeda | G06F 17/30277 |
| 2006/0246878 | A1* | 11/2006 | Khoury | 455/412.2 |
| 2011/0035451 | A1* | 2/2011 | Smith | G06Q 10/107 709/206 |
| 2013/0282841 | A1* | 10/2013 | Bates et al. | 709/206 |

* cited by examiner

*Primary Examiner* — Backhean Tiv
*Assistant Examiner* — Alan S Chou
(74) *Attorney, Agent, or Firm* — Procopio, Cory, Hargreaves & Savitch LLP

(57) ABSTRACT

Rule-based content filter is described, including receiving from a user an indication of an attempted posting of content to a target, wherein the attempted posting of the content by the user comprises at least one item provided by the user for display on a website to the target; selecting a rule associated with the user, wherein the rule is selected based on at least one of the content of the attempted posting and an identity of the target; applying the rule to the attempted posting to determine whether a condition applies, the condition relating to whether the attempted posting complies with the rule; when the condition applies, posting to the target; and when the condition does not apply, providing an indication to the user that the attempted post does not comply with the rule.

19 Claims, 10 Drawing Sheets

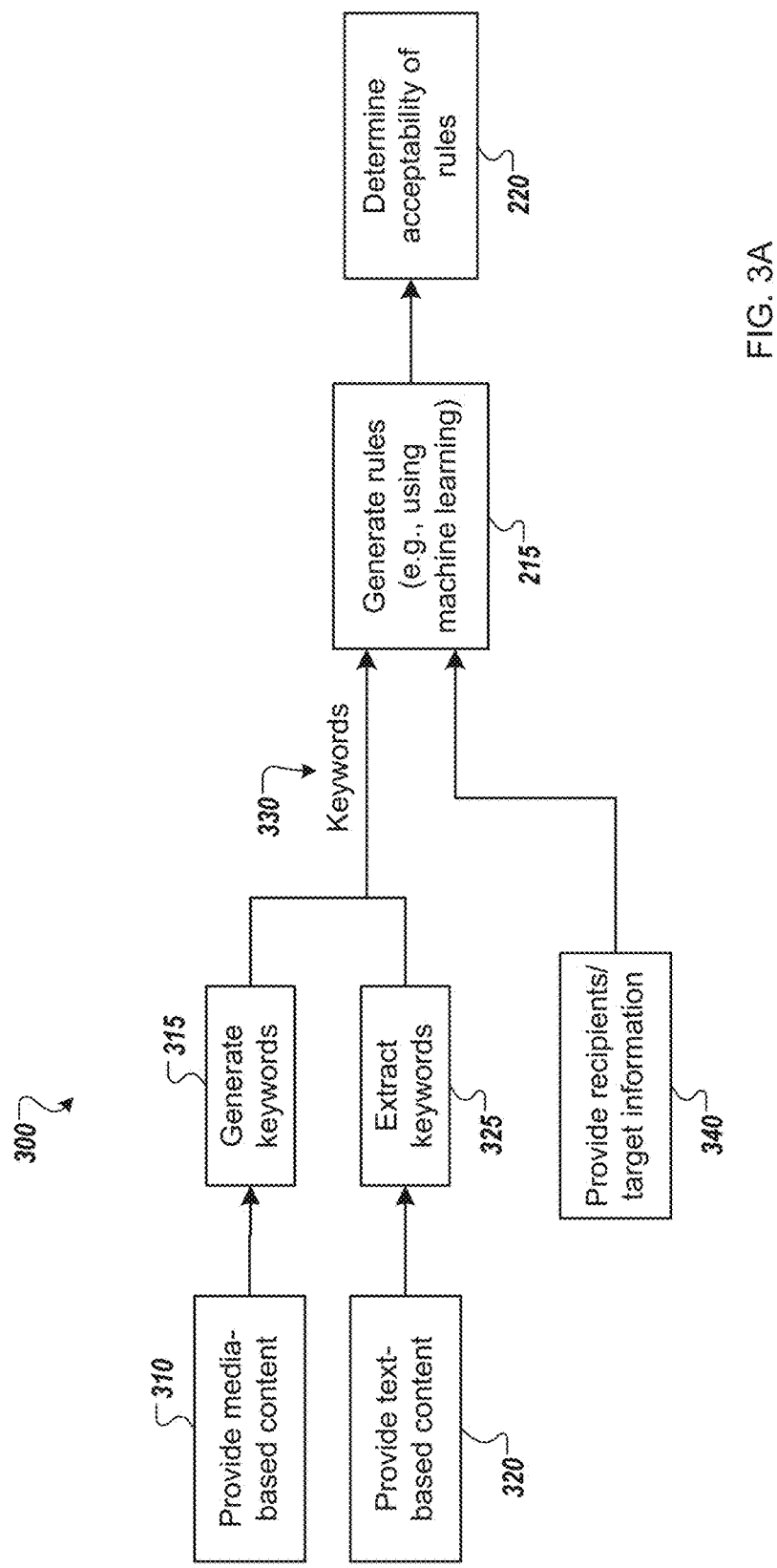

500

| | Keyword | Recipient | Score |
|---|---|---|---|
| 540 | beer | grandma | 1 |
| 541 | beer | Joe | 7 |
| 542 | beer | Terry | 8.7 |
| | hang out | grandma | 3 |
| | hang out | Joe | 6 |
| | hang out | Terry | 8 |
| | hugging | grandma | 9 |
| | hugging | Joe | 0 |
| | hugging | Terry | 4 |

| | Keyword | Circle | Score |
|---|---|---|---|
| 590 | beer | Micro Brewer | 9.5 |
| 591 | beer | College | 7.9 |
| 592 | beer | Family | 2 |
| 593 | Do not cuss | Professional | 9.5 |
| 594 | Do not cuss | College | 3 |
| 595 | Do not cuss | Family | 7 |

FIG. 5B

RULE-BASED CONTENT FILTER

BACKGROUND

Technical Field

The subject matter discussed herein relates generally to data processing and, more particularly, to a rule-based content filter.

Related Background

Users may assume more than one role in the physical world as well as in online virtual communities. For example, a user, Jon, may assume the roles of son, grandson, husband, father, teacher, former college student, current graduate student, hiker, beer collector, traveler, member of an aviation club, politician, etc.

Jon may communicate and share content with other users online, such as on a social network or an email communication system. Jon may group users with whom he communicates in social graphs, such as circles or groups based on one or more criteria. For example, Jon may group users who are his family members in a "Family" circle. Jon may group users who are his students in a "Students" circle or a "Teaching" circle. Jon may create an "Aviation" circle for users with like interests. For example, the users in the "Aviation" circle that Jon creates may predominantly include his former university colleagues (e.g., alumni) who may be friends. Additionally, the "Aviation" circle that Jon creates may also include his students and members of his family (e.g., relatives).

Due to the number of circles and users that Jon has created, it may be difficult for Jon to continually remember the members of his circles or groups. Accordingly, unintentional posting or sharing of content that is inappropriate for a particular group may occur when Jon cannot remember all of the members of that group. For example, Jon may freely express himself to the users in the "Aviation" circle that are mature users using language that may be considered inappropriate to family members and students who are part of the "Aviation" circle.

A solution without the above limitations is needed.

SUMMARY

A rule-based content filter is described. The subject matter includes at least a computing device, a computer product, and a method for receiving from a user an indication of an attempted posting of content to a target, wherein the attempted posting of the content by the user comprises at least one item provided by the user for display on a website to the target; selecting a rule associated with the user, wherein the rule is selected based on at least one of the content of the attempted posting and an identity of the target; applying the rule to the attempted posting to determine whether a condition applies, the condition relating to whether the attempted posting complies with the rule; when the condition applies, posting to the target; and when the condition does not apply, providing an indication to the user that the attempted post does not comply with the rule. The rule may be created manually or automatically.

BRIEF DESCRIPTION OF THE DRAWINGS

FIG. 3A shows an example of rules generation based on machine learning.

FIGS. 5A-B show example scores used in implementing some example embodiments.

DETAILED DESCRIPTION

The subject matter described herein is taught by way of example embodiments. Various details have been omitted for the sake of clarity and to avoid obscuring the subject matter. Examples shown below are directed to structures and functions for implementing a rule-based content filter.

Overview

Example embodiments are described that enable users to share or post desired content to the desired audience. For example, users may be prevented from unintentional posting of content (e.g., language that might be considered foul, images that might be considered offensive, political or religious commentary that might be considered insensitive or inflammatory, etc.) to the undesired audience. The users' interactions and/or communications with other users are guarded to prevent reputation hits or embarrassing content leaks.

Users do not need to remember who is, for example, in each of their social media audience groupings (e.g., circles) when sharing or posting content. Mechanisms such as user interfaces are provided for users to specify rules that will help the user in channeling the right content to the right audience, and preventing the wrong content to be posted to the wrong audience.

For example, a user may generate a rule effectively indicates that the user does not wish to post potentially offensive language or photographs to a specific family member. As another example, the user may specify another rule that effectively indicates that the user does not wish to share content relating to the certain personal hobbies or interests to the "coworkers" circle.

In some example embodiments, rules may be automatically generated. For example, the user's historical or previous posting or sharing of content may be analyzed (e.g., by a machine learning process) to generate the rules.

At the time the user posts or attempts to post or share something (e.g., content) with some target audience, one or more rules may be identified and applied based on the content and/or based on the target. When the rule conditions are met for posting the content, the content is allowed to post to the target audience.

However, when the rule conditions are not met for posting the content, the content is blocked from posting to the target audience. In some example embodiments, a warning message (e.g., the post might contain inappropriate content for the given target audience) may be provided to the user. The user may be given one or more opportunities to override the blockage. If the User Overrides the Blockage (e.g., the User has Shown an Intent to Post the Content to the target audience), the content is allowed to post to the target audience.

Example Processing Environments

Figure 1:
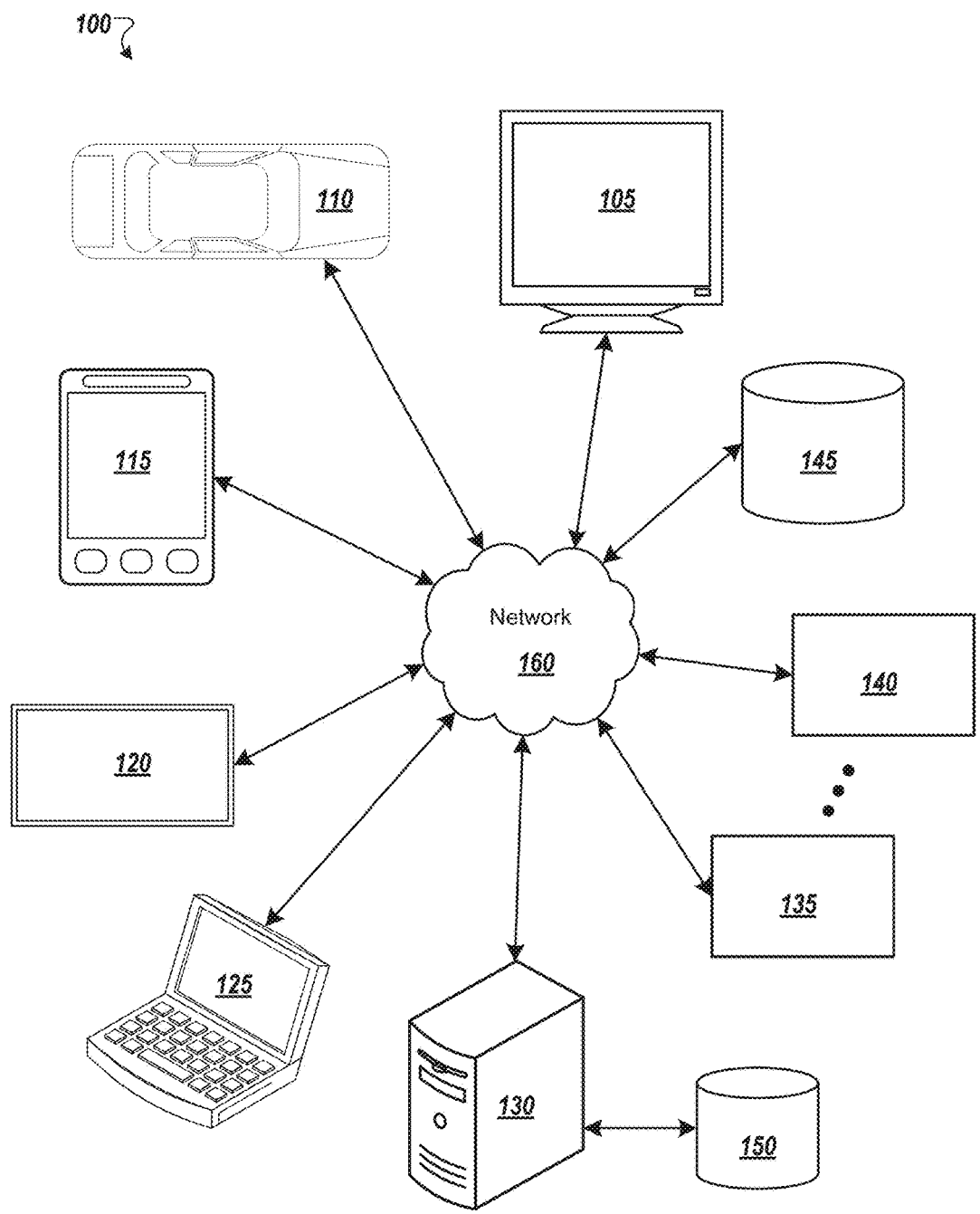
FIG. 1 shows an example online environment in which some example embodiments may be implemented and/or operated.

FIG. 1 shows an example online environment in which some example embodiments may be implemented and/or operated. Environment 100 includes devices 105-150, each is communicatively connected to at least one other device via, for example, network 160. Some devices may be communicatively connected to one or more storage devices 145 and 150 (e.g., via device 130).

An example of one or more devices 105-150 may be computing device 805 described below in FIG. 8. Devices 105-150 may include, but are not limited to, a computer 105 (e.g., personal or commercial), a device in a vehicle 110, a mobile device 115 (e.g., smartphone or tablet), a television 120 with one or more processors embedded therein and/or coupled thereto, a mobile computer 125, a server or desktop computer 130, computing devices 135-140, storage devices 145-150. Any of devices 105-150 may access one or more services from and/or provide one or more services to one or more devices shown in environment 100 and/or devices not shown in environment 100.

A user may post content using, for example, a device 115 to one or more users, who may be receiving the content using devices 105, 110, 120, and 125. The content may be checked or determined for appropriateness for posting by a service provided on device 130 using one or more rules retrieved from storage device 145 or 150. The content may be determined to be acceptable for posting to some users and not acceptable for posting to other users based on the rules. In the latter situation, a warning or overriding mechanism may be provided to the user.

Example Processes

Figure 2:
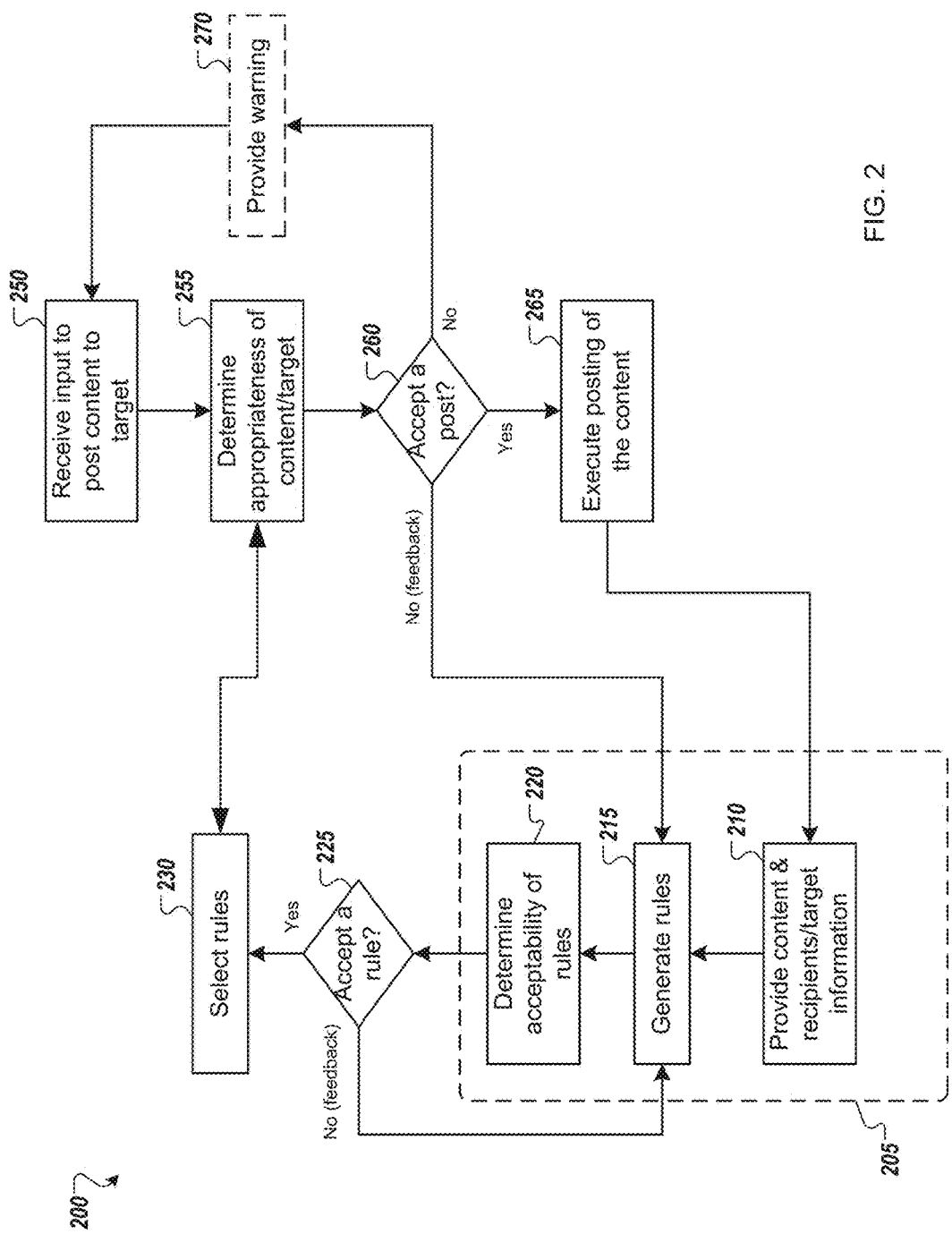
FIG. 2 shows an example data flow diagram of a system implementing some example embodiments.

FIG. 2 shows an example data flow diagram of a system implementing some example embodiments. Blocks 210-220 are shown enclosed in group 205, which is described in detail in FIGS. 3A-B below. System 200 starts with providing data, such as content and target information (e.g., content recipients) at block 210. Data provided at 210 may include, but are not limited to, data relating to users, circles, content, posted content, historical postings, logs, and other data (e.g., email and/or other communication messages).

For example, block 210 may provide existing or saved email messages, other communication history, and/or historical postings that identify a correlation between the content (or subject matter of the content) of the postings with respect to target information (e.g., recipient users and/or circles). Data provided at 210 may be associated with one or more sources or services (e.g., email and/or other communication channels) that may be the same as and/or different from the service that uses the rules generated from the data.

At block 215, the provided data from block 210 are used to generate one or more rules based on the correlation. For example, but not by way of limitation, a historical posting, posted by the user, may include content directed to the subject of "beer drinking" (e.g., discussion of beer drinking, or images that include beer and people) posted to a "Micro Brewer" circle of users. Another historical posting by the user may include content directed to the subject of "air shows" or "airplanes" (e.g., discussion of the subject or images directed to air shows or airplanes) to an "Aviation" circle of users. In some example embodiments, feedback from 225 and/or 260 may be incorporated in rule generation.

After receiving and correlating (e.g., "learning" from) such historical postings, one or more rules may be generated or suggested. For example, Rule 1 may be generated, directed to correlating the subject or keyword of "beer drinking" with the "Micro Brewer" circle of users (e.g., it is appropriate to post content that includes the subject of beer or beer drinking to any user in the "Micro Brewer" circle). Rule 2 may be generated, directed to correlating the subject or keywords of "air shows" or "airplanes" with the "Aviation" circle of users, and not with the "Micro Brewer" circle of users.

In some example embodiments, Rule 1 may specify that the subject or keyword of "beer drinking" is not correlated with the "Aviation" circle of users (e.g., it is inappropriate to post content involving the subject of beer or beer drinking to any user in the "Aviation" circle).

In some example embodiments, rules (e.g., Rule 1 and Rule 2) are generated in association with a user. For example, the user may login to a service or otherwise identify himself or herself to a service provider. Information provided in block 210 is information associated with the user (e.g., the user's postings of content and the user's recipients and target information). Rules generated using the information are associated with the user (e.g., for applying to the user's future postings or attempted postings).

In some example embodiments, block 220 and 225 may be bypassed based on implementation. In other example embodiments, at block 220, a generated rule may undergo acceptability determination based on implementation. For example, the acceptability of Rule 1 and/or Rule 2 may be determined automatically by system 200 or determined based on user input.

If a rule is not determined to be acceptable, at block 225, the results may be provided as feedback to block 215. Block 215 may change (e.g., regenerate) the "unaccepted" rule, based on the feedback and/or learn from the feedback to, for example, "fine tune" rules generation. If a rule is determined to be acceptable, at block 225, the rule is provided at block 230 to process new posting or sharing of content.

For example, a user may attempt to post or share content to one or more users and/or circles (target or recipient), at 250. The attempt to post or share content may include text-based content (e.g., text messages) and or media-based content (e.g., images, photos, videos, audio, etc.). At 255, a determination is performed to confirm the appropriateness of the attempted posting by applying one or more rules provided by 230. One or more rules that are to be applied at 255 are determined and selected based on the content that the user attempts to post or share. The rules, which are associated with the user, are applied prior to execution of the attempted post or sharing.

In one example, the content the user is attempting to post contains subject matter that includes beer or beer drinking. Rule 1 (e.g., correlating the subject or keyword of "beer drinking" with the "Micro Brewer" circle of users) associated with the user, may be selected based on the content (e.g., the content triggers Rule 1). In this example, the target (e.g., recipients) includes User A, who is included in the "Micro Brewer" circle, and User B, who is not included in the "Micro Brewer" circle. A service provider may (e.g., at block 255) determine the appropriateness of posting the content (e.g., beer or beer drinking subject matter) to User A and User B using Rule 1. Since User A is in the "Micro Brewer" circle, satisfying Rule 1 at block 260, the attempted posting of the content to User A is executed, e.g., allowed to proceed, at block 265 (e.g., the post to User A is appropriate and accepted, thus executing the posting).

However, since User B is not in the "Micro Brewer" circle, the attempted posting is not accepted at 260 based on Rule 1 (e.g., the attempted post by the user to User B is determined to be inappropriate with Rule 1). As a result, the attempted posting may be blocked (e.g., not executed). In some example embodiments, the user who is attempting to post the content to User B may be provided with an indication, at block 270, that warns the user that content in his or her attempted post that is directed to "beer drinking" may not be appropriate for posting to User B. The user may be given an option to override the warning (not shown) and proceed to execute the posting of the content to User B.

In another example, the user may be attempting to post an image of new airplanes to User A and User B. User B is included in the "Aviation" circle but User A is not. Rule 2 (e.g., correlating the subject or keywords of "air shows" or "airplanes" with the "Aviation" circle of users) associated with the user may also be selected based on the target information (e.g., the User B being in the "Aviation" circle triggers Rule 2). At block 255, Rule 2 is applied to determine the appropriateness of posting the subject matter of airplanes to User A and User B.

Since User A is not in the "Aviation" circle, the attempted posting to User A is not accepted at 260. A warning may be provided to the user at 270, for example, indicating a reason why the attempted posting fails. On the other hand, since User B is in the "Aviation" circle, the attempted posting to User B is accepted at 260, and the attempted posting is executed to post the image of new airplanes to User B at block 265.

In some example embodiments, a rule may be generated as a whitelist rule. A whitelist rule "allows" the posting of subject matters associated with the rule only to recipients associated with the rule. For example, Rule 3 may be generated as a whitelist rule for correlating content that involves hugging with the "Family" circle. As such, content which involves hugging may only be allowed to post to a user who is in the "Family" circle. An attempted posting of content which involves hugging to User C, who is not in the "Family" circle, is not accepted (unless there is another rule also applicable and having a higher or overriding precedent).

In other example embodiments, a rule may be generated as a blacklist rule. A blacklist rule "allows" the posting of subject matters associated with the rule only to recipients not associated with the rule. For example, Rule 4 may be generated as a blacklist rule for correlating content that involves cussing with the "Professional" circle. As such, content which involves cussing may be allowed to post to a user only if that user is not in the "Professional" circle. An attempted posting of content which involves cussing to User C, who is not in the "Professional" circle, is accepted (unless there is another rule also applicable and having a higher or overriding precedent).

In some example embodiments, there may be two or more rules applicable to an attempted posting. For example, one rule may be selected based on the content. The content may involve two or more subject matters with two or more associated rules. A content-based rule may be a whitelist rule, a blacklist rule, or there may be both (e.g., whitelist and backlist) based on content. Another rule may be selected based on a recipient. A recipient-based rule may be a whitelist rule, a blacklist rule, or there may be both (e.g., whitelist and backlist) based on a recipient.

When two or more rules are applicable to an attempted posting, depending on implementation, precedent, priority, score, and/or other deciding mechanisms may be used to aid in selecting and/or applications of the rules.

In some further example embodiments, the user who is attempting to post may be given an option to update and/or fine tune the rule base (e.g., Rule 1 and/or 2). The user may fine tune the application of the rule base by verifying or correcting a determination based on the rule. For example, the user may fine tune Rule 1 to account for a situation where the rule has been triggered based on an incorrect determination at 255 that the content of the attempted post includes "beer." More specifically, the user may fine tune the rule to distinguish between a can of "soda" having labeling (e.g., text of image) that may appear similar to a "beer" label or image and thus be characterized by the rule base as a can of "beer."

The user's input in fine tuning rules and/or application of rules may be provided as feedback to use in rules generation (e.g., feedback from block 260 to 215). Further, updating may be performed on one or more accepted rules (not shown), so as to fine tune its image detection process (described in more detail in FIG. 3A), and/or perform other improvements or machine learning techniques.

FIG. 3A shows an example of rules generation based on machine learning. Data flow 300 is an example implementation of block 205 of FIG. 2. Flow 300 starts, on one track, with block 310 where media-based content is provided. At block 315, the media-based content is processed to generate a keyword. On another track, at block 320, text-based content is provided to block 325 where keywords are extracted. Keywords 330 (e.g., generated and/or extracted) are provided to block 215. Also provided to block 215 is recipients/target information from block 340. One or more rules are generated at block 215 based on keywords 330 and recipients/target information provided from block 340. Blocks 215 and 220 have been described above in FIG. 2.

Generating rules with media-based content, at block 215, includes processing the media to generate keywords, at block 315. In some example embodiments, the media may be images and/or videos. Videos may be processed as a series of images.

Keywords may be generated in any fashion known to one skilled in the art. Keywords generation may involve processing information from one or more sources or channels. For example, one channel of information may be the photo data itself (e.g., the image). Another channel of information may be the photo meta-data (e.g., camera type, the location of the photo, exposure and aperture settings, the time of day, and the recipient list, etc.). Other channels of information may be any information associated with an image. For example, if an image is posted on a website for certain users to view or access, information about the website and/or the certain users may be included in the processing for keywords.

One example generation of keywords or annotations from an image itself may be dividing the image (e.g., a 1000×800 pixels image) into regions (e.g., regions of 10×10 pixels) and performing image processing or recognition on the regions. For example, the shape of a glass may be detected in one region, a beer can, bottle, or label (e.g., "Beer") may be detected in another region, a balloon may be detected from a third region, etc. When all the objects or keywords are detected from an image, collectively or individually, these keywords may be used in creating rules (e.g., in block 215).

The same or different image processing techniques may be used in applying rules to determine the acceptability of attempted postings (e.g., block 255, FIG. 2). For example, when a user attempts to post an image with a bottle of beer in the image, the bottle of beer may be detected as described above or in a different manner to select a rule associated with the user that involves "beer" or "drinking" to determine the appropriateness of posting.

With keywords generated or extracted from images, the keywords are associated with recipients to generate one or more rules. At block 340, recipients or target information may be provided (e.g., by a user) and/or extracted from other sources. For example, using historical postings of images (e.g., posting of the image of beer drinking), the target information of the historical postings may be processed and recipients extracted. For example the beer drinking image may be posted to one or more users in a "Micro Brewer" circle or to the "Micro Brewer" circle itself. With the target information, the users and/or "Micro Brewer" circle may be extracted.

At block 215, machine learning may be used to generate one or more rules (e.g., Rule 1). For example, a "machine" (e.g., processing unit), based on the extracted keywords of "beer" and "drinking" and target information (e.g., the "Micro Brewer" circle), may learn that the subject matters of "beer" and/or "drinking" may be posted to the "Micro Brewer" circle or any user in that circle.

FIGS. 5A-B show example scores used in implementing some example embodiments. FIG. 5A shows an example of scores associated with users. FIG. 5B shows an example of scores associated with circles. In some example embodiments, scores may be associated with target information that is a mixture of users, circles, and other user groupings, classifications, or organizations.

Table 500, in FIG. 5A, shows that, for example, scores may be saved associated with users based on the "learning." For example, with just one beer drinking posted to the user of "grandma" a score of "1" may be kept or assigned on row 540, column 30.

More keywords from 315 and recipients from 340 may be provided to block 215 to generate rules. For example, there may be a few more images that involve beer drinking (and some of these images may involve other subject matters or keywords). Some of these images may have been posted to the users "Joe" and "Terry," or circles which "Joe" and/or "Terry" is a member of, with "Terry" being as a recipient more frequent than "Joe." Being as more frequent recipients the "grandma," "Joe," and "Terry," rows 541-542, respectively, are assigned higher scores than "grandma." The example table 500 shows that "Joe" is assigned a "7" and "Terry" is assigned an "8.7."

Table 550, in FIG. 5B, shows that, for example, scores may be saved with circles of users based on the machine learning. There may be many more images of "beer" and/or "drinking" posted to the "Micro Brewer" circle than in the "College" and "Family" circles, with the "Family" circle being the recipient in the least. The scores of "9.5," "7.9," and "2" are, for example, assigned to the "Micro Brewer," "College," and "Family" circles, respectively, in rows 590-592.

The scores in tables 500 and 550 may be used, for example, in block 255 (FIG. 2) to determine the appropriateness of posting or attempted posting of content. The scores may be used with one or more threshold values. For example, an implementation may use a threshold of 5 (any value may be used).

In an attempt by a user to post a beer or drinking photo to the user "grandma," the above-described image detection techniques may be used to detect that the image involves beer and/or drinking (e.g., extracted the keywords "beer" and/or "drinking"). A rule (e.g., Rule 1) may be selected based on the content or recipient. Table 500 may be consulted and found that, on row 540, "beer" associated with "grandma" has a score of "1". Block 255 determines that "1" is less than 5, and the attempted posting is not accepted at 260.

In some example embodiments, a warning (e.g., "It looks like you do not typically share this type of photo with grandma, are you sure you wanted to share this photo with grandma?") and/or user options may be provided. For example, one option may be allowing the user to click on "Yes, go ahead and post" (e.g., post the beer drinking image to "grandma").

On the other hand, if the recipient is "Joe" and/or "Terry," with a score of "7" and/or "8.7," respectively, being above the threshold of 5 would be determined at 255 to be appropriate and accepted at 260 for posting.

Returning to FIG. 3A. The process of generating rules with text-based content, provided at 320, is similar to the process of generating rules with media-based content. Keywords from the text-based content are extracted using text processing techniques known to one skilled in the art. The recipients/target information, as described above, may be extracted or processed from historical postings of the text-based content (e.g., extract the recipients of a sent email message).

Similarly, scores may be kept and/or assigned for recipients or circles based on the historical text-based content postings. Application of rules is as described above. In some example embodiments, rules created from historical text-based content may be distinguished from rules created from historical media-based content. Scores associated with the different types of historical content may be kept separately and/or applied differently. For example, scores associated with media-based content may be given different weight than scores associated with text-based content.

Figure 3B:
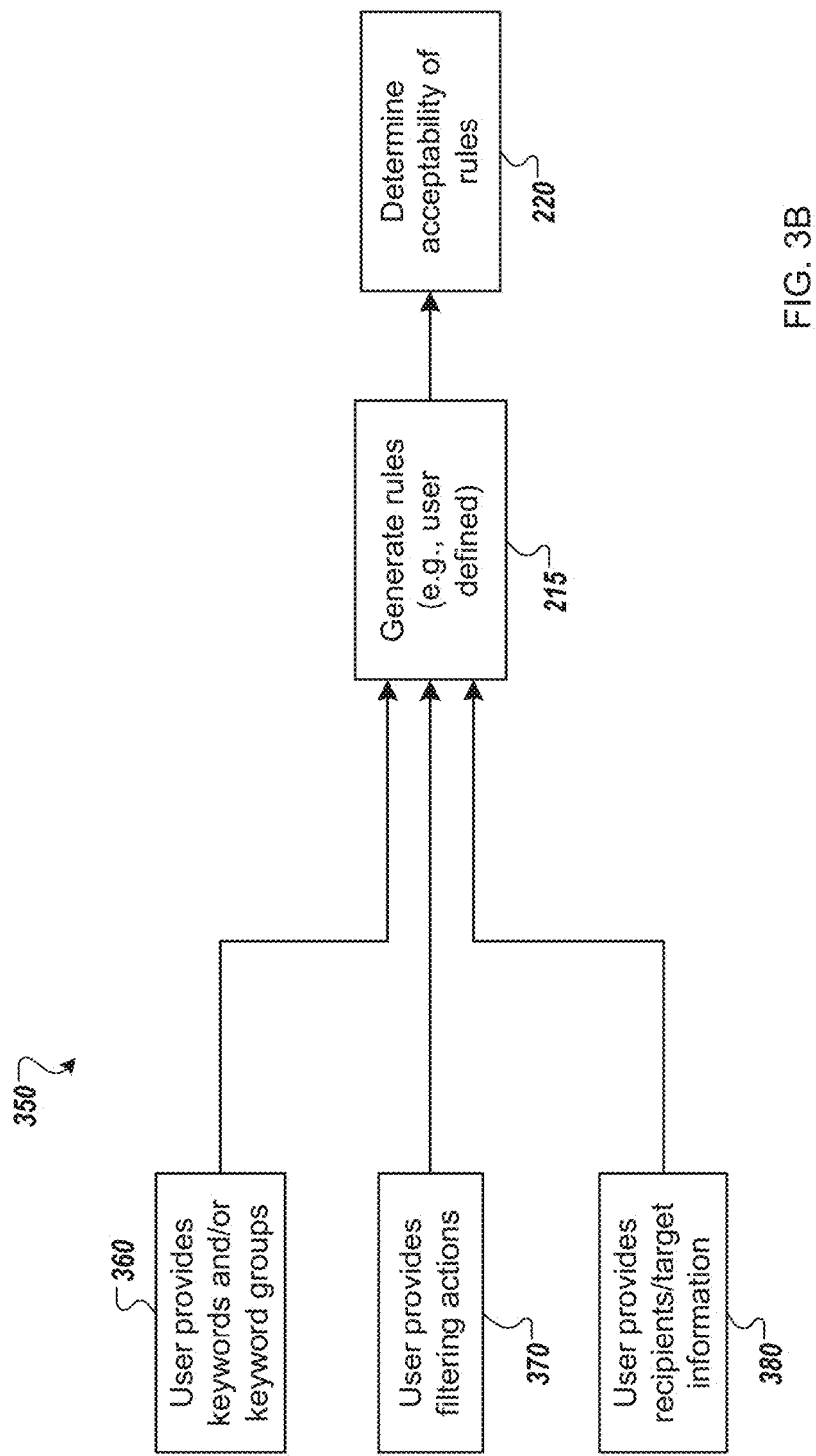
FIG. 3B shows an example of rules generation based on user input.

FIG. 3B shows an example of rules generation based on user input. In the alternative or in addition to rules generation using machine learning (e.g., automatically) as described above in FIG. 3A, one or more rules may be provided (e.g., defined or specified) by a user. Data flow 350 shows that a user may provide one or more keywords and/or keyword groups at block 360, filtering actions at block 370, and target information at block 380. In some example embodiments, some of keywords, filtering actions, and target information may be provided by other sources (e.g., another user and/or boxes 310 and 320 above). At block 225, the filtering actions, associate, or correlate the keywords or keyword groups with the target information to form or generate one or more rules.

A user may provide, define, or specify information (e.g., the keywords, keyword groups, filtering actions, and/or target information) using a user interface (not shown). For example, the user interface may include, but is not limited to, widgets (e.g., a text box, selection box, etc.) with which a user can input one or more keywords, filtering actions, and/or target information.

A keyword may be any word or combination of words (e.g., "beer," or "drinking," or "hang out," etc.). Target information is recipient information (e.g., users, circles, a combination thereof, etc. as described above). Filtering actions may be, for example, "blocked from" or "published only to" the identified target user or circles of target users. These are only two examples of filtering actions. A user may define, provide, or select a predefined filtering action (not shown) to be performed when a defined rule is triggered. For example, "ignore," "ignore and warn," "apply Rule X," "update score and post," etc.

For example, and not by way of limitation, a user may input the keyword of "beer drinking," select the "Micro Brewer" circle of users as target information, and select the filtering action "publish only to." In another example, a user may input the keyword "beer drinking," select as target information the "Aviation" circle of users, and select the filtering action "blocked from."

In some example embodiments, the user may group two or more keywords into a keyword group. For example, the keywords "cat," "dog," "fish," and "bird" may be grouped into a "pet" keyword group. As another example, keywords that identify profanity, swearing, cursing, "dirty" words, bad words, bad or foul language, cussing, etc. may be grouped into a "cussing" or "do not cuss" group. Any identifier or combination of characters may be used as a keyword group label. These are only two examples. A user may group any keywords, related keywords or arbitrary or unrelated keywords into keyword groups.

In some example embodiments, a keyword group may be implemented and/or used as if it is a keyword. Table 550, in FIG. 5B, shows that, for example, scores may be associated with circles of users based on keyword group (e.g., "Do not cuss"). For example, based on user provided information (e.g., keyword group "Do not cuss" and/or keywords in that group 360, filtering actions 370, and target information 380, FIG. 3B), one or more rules may be created that result in the scores shown in rows 593-595 of table 550. The scores of "9.5," "3," and "7" are, for example, assigned to the "Professional," "College," and "Family" circles, respectively, in rows 593-595.

After receiving and recognizing the user-specified correlation between the user provided keywords and/or keyword groups, target information, and filtering actions, one or more rules may be generated and/or recorded (e.g., Rule 1, Rule 2, Rule 3, and/or other rules). For example, to create a whitelist rule, the filtering action "published only to" may be selected.

To create a blacklist, the filtering action "blocked from" may be selected. For example, Rule 3 may be defined as "inappropriate to post content involving the subject beer or beer drinking to any user in the "Aviation" circle," based on the recognized user specified correlation between the user-provided keyword "beer drinking," the user-specified target information "Aviation" circle of users, and the user-selected filtering action "blocked from."

In some example embodiments, user-based rules (e.g., rules created with flow 350) and rules generated by machine-learning (e.g., rules created with flow 300) may be used at the same time. After rules are created, the rules may be applied or used as described above.

Example User Interfaces

Figure 4:
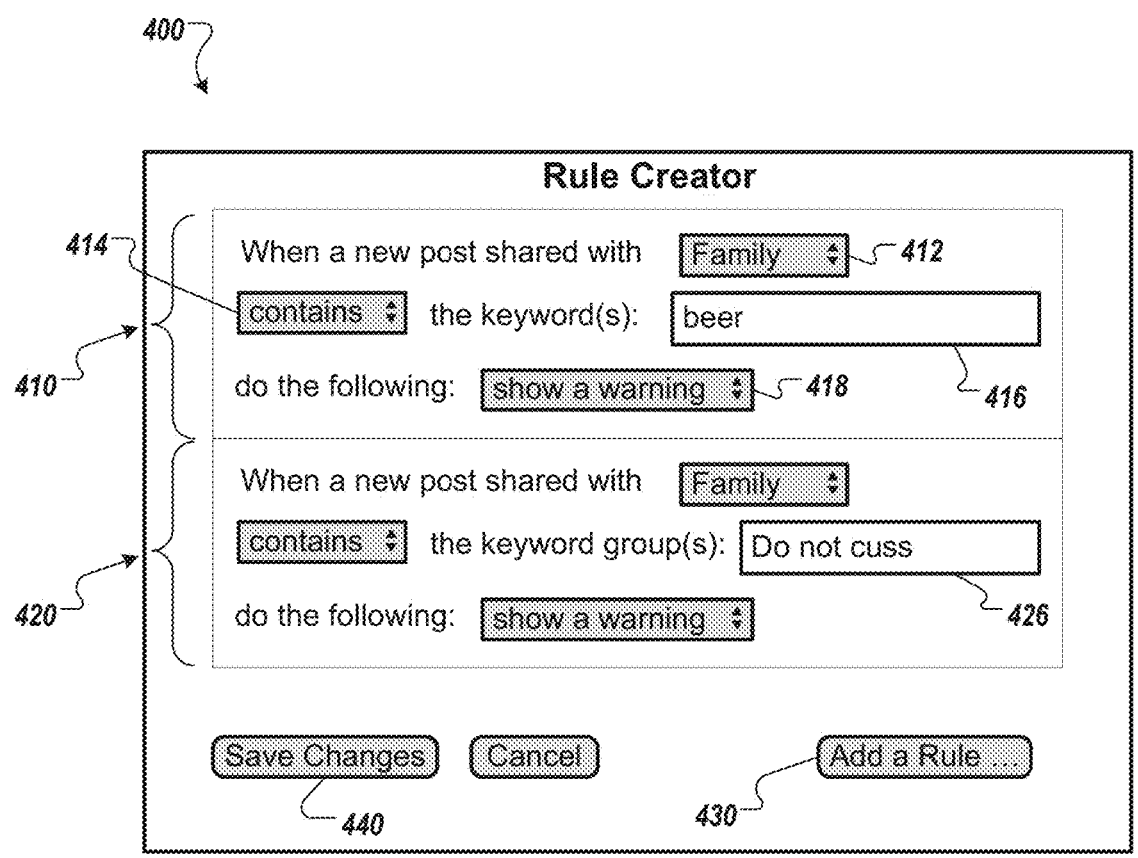
FIG. 4 shows an example user interface a user may use to generate one or more rules in some example embodiments.

FIG. 4 shows an example user interface a user may use to generate one or more rules in some example embodiments. User interface (UI) 400 is illustrated with rules 410 and 420, which may be added or changed. A control 430 may be activated to add another rule, and a "Save Changes" button 440.

For example, widgets for generating rule 410 include a widget 412 for the user to provide or change the target information. Target information may be any combination of target (e.g., one or more users and/or one or more circles, etc.). UI 400 includes a widget 414 for the user to provide or change an operator that links the keyword(s) to content (e.g., content to be processed). Example operators may include, but are not limited to, "contains," "does not contain," "contains similar," etc.

UI 400 includes a widget 416 for the user to provide or change one or more keywords and a widget 418 for the user to provide or change one or more filtering actions. Example filtering actions are described above but are not limited to the described filtering actions. UI widgets for entering rule 420 shows that a rule may be based on one or more keyword groups 426 (e.g., "Do not cuss"). In some example embodiments, a rule (not shown) may be based on a combination of one or more keywords and one or more keyword groups.

Figure 6A:
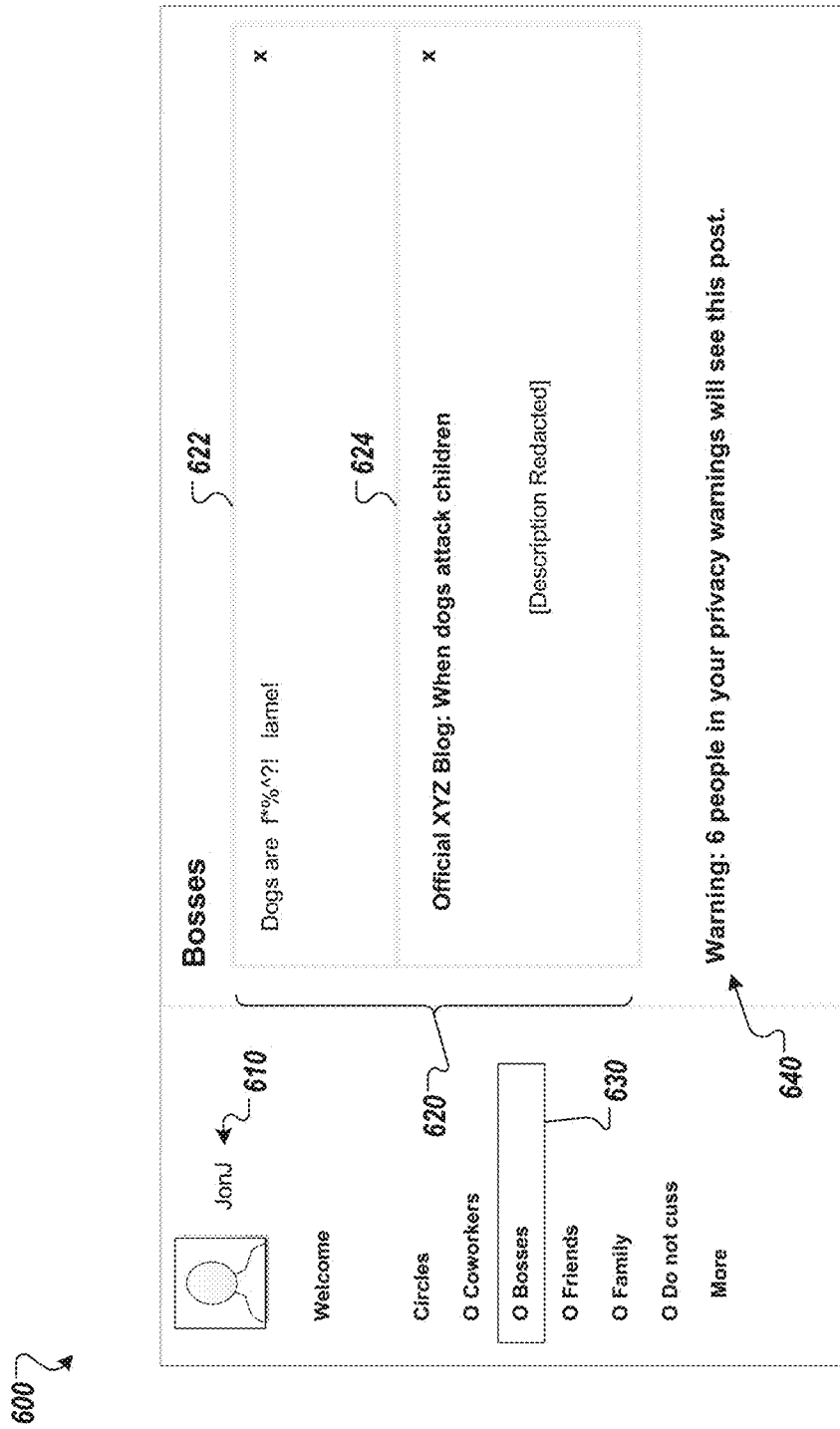
FIG. 6A shows an example user interface suitable for at least some example embodiments.

FIG. 6A shows an example user interface suitable for at least some example embodiments. User interface (UI) 600 shows a user 610 (e.g., "JonJ"), content 620, target information 630, and a warning 640. Content 620 may include different parts, such as the user's optional comment 622 and share information 624. Share information 624 may be any information or combination of information, such as text, images, audios, videos, documents, a posting by another user, etc. Target information 630 (e.g., the "Bosses" circle) may be any or any combination of intended recipients or recipient information.

Here, user "JonJ" is attempting to post content 620 to the users in his "Bosses" circle. Based on the content 620 (e.g., based on his comment 622 and/or share information 624), the target information (e.g., the "Bosses" circle 630), or both, one or more rule may be identified, selected, and applied to determine the appropriateness of JonJ's attempted posting. For example, a profanity (e.g., foul language) is detected from comment 622 and the "Do not cuss" keyword group is identified based on the profanity. The appropriateness determination, in this example, results in not accepting the attempted posting, as indicated by the warning 640.

Figure 6B:
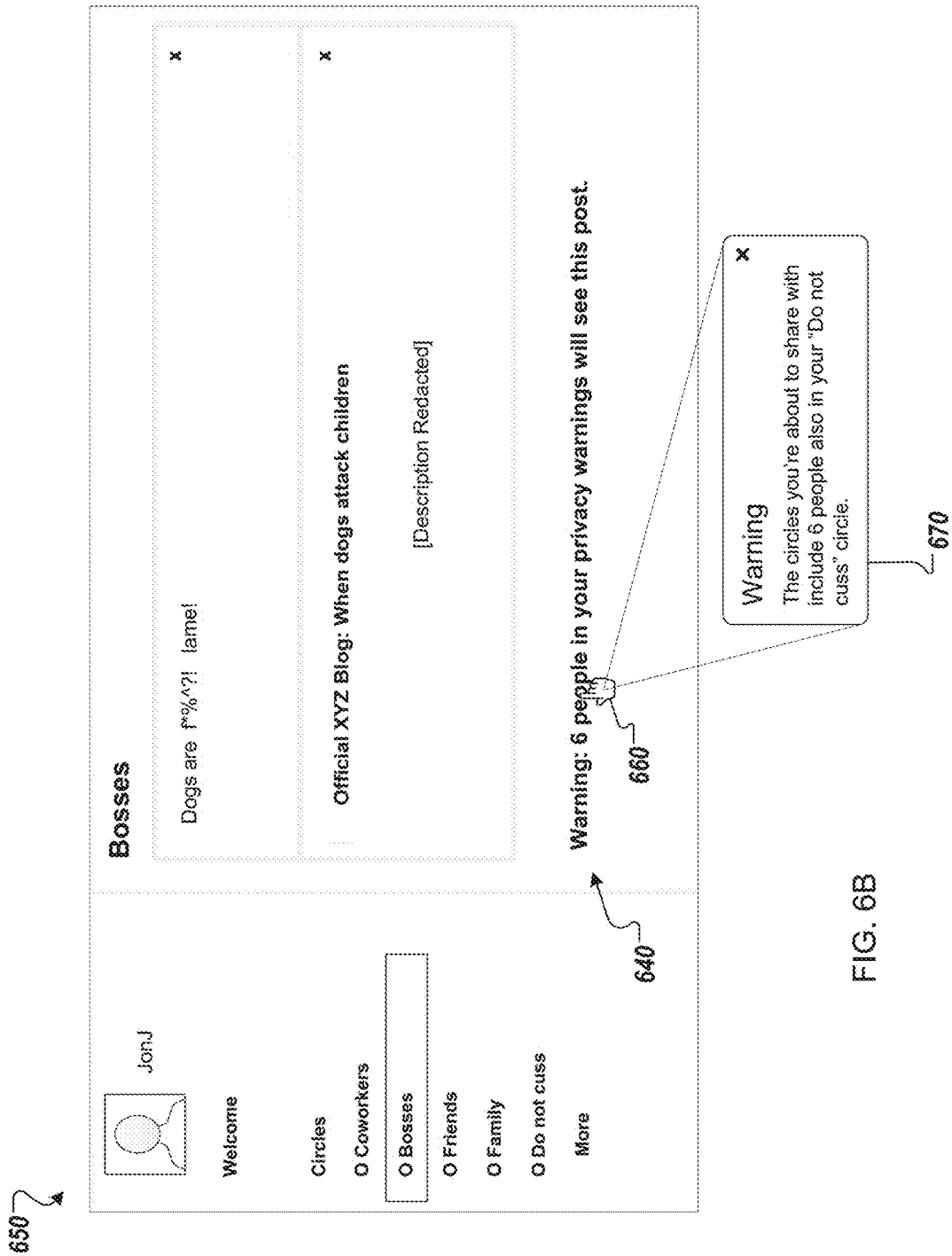
FIG. 6B shows additional example features of the user interface of FIG. 6A.

FIG. 6B shows additional example features of the user interface of FIG. 6A. UI 650 shows that JonJ may learn further information about the warning 640 using, for example, a navigation pointer 660. JonJ may click on a part of the warning or hover the navigation pointer 660 over a part of the warning to activate the revealing of additional information 670. It turns out that, in this example, there are six users in the "Bosses" circle also in JonJ's "Do not cuss" circle. One of the applied rules that results in this warning may be generated for associating cussing with target information that includes the "Do not cuss" circle.

In some example embodiments, JonJ may be given one or more choices to handle the warning (not shown). For example, there may be an overriding mechanism (e.g., an "Ignore the warning/Continue to post" button) for JonJ to bypass or ignore the warning and post content 620 to the "Bosses" circle. The use of the overriding mechanism may provide feedback on the applied rules to enhance the applied rules, the applications of rules, the score tables, other rules, and/or new rules generation. For example, there may be scores kept, for example, in table 500 (FIG. 5A) for the six users associated with "cussing." The feedback from activating the overriding mechanism may change their scores in the table, affecting future application of rules associated with "cussing."

Additional Example Processes

Figure 7:
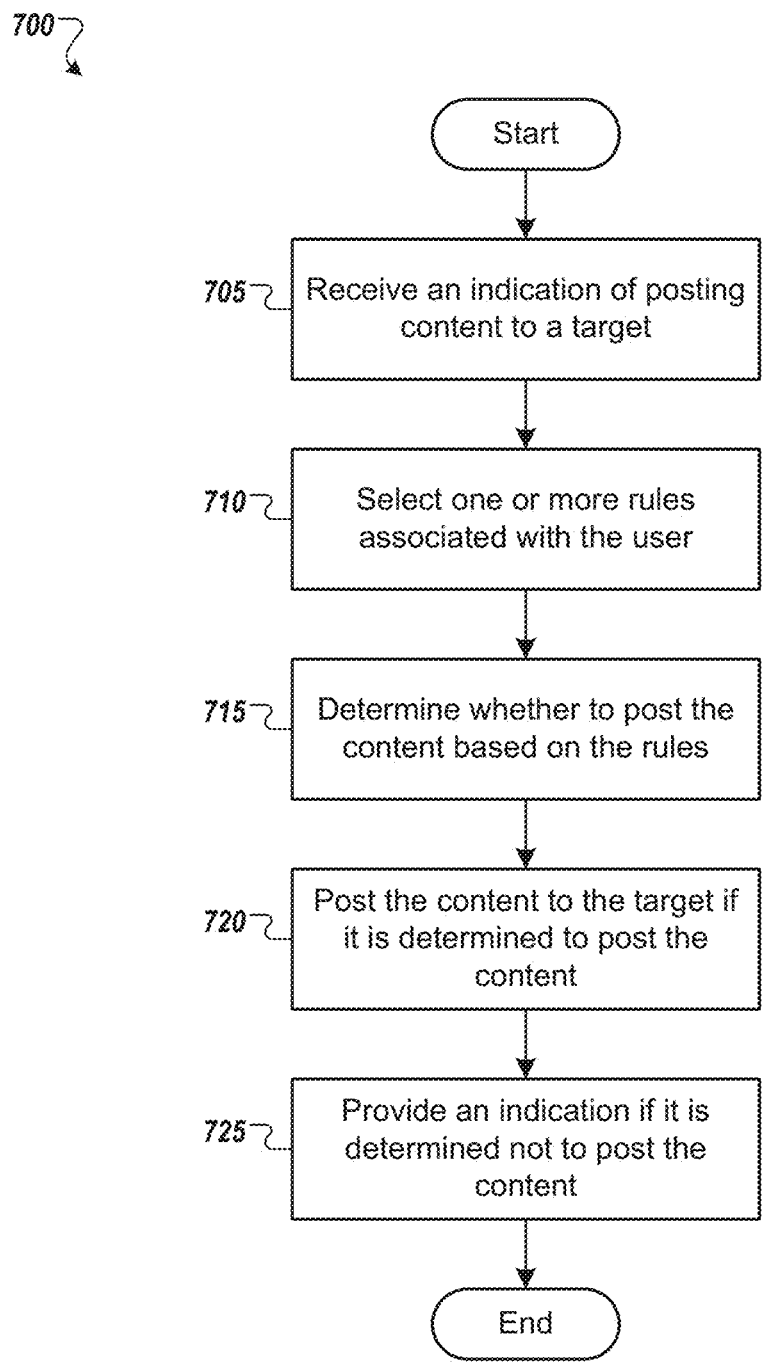
FIG. 7 shows an example process implementing some example embodiments.

FIG. 7 shows an example process implementing some example embodiments. Process 700 starts with, at block 705, receiving from a user an indication of an attempted posting of content to a target, wherein the attempted posting of the content by the user may include one or more items provided by the user, for example, for display on a website. At block 710, a service provider for the attempted posting selects one or more rules associated with the user, wherein the rules are selected based on the content of the attempted posting and/or an identity of the target. For example, the content of the attempted posting may be processed to extract or generate one or more keywords. At block 715, the selected rules are applied or used to determine whether to post or execute the attempted posting (e.g., whether the attempted posting complies with one or more rules or is prohibited by one or more rules). For example, the extracted or generated keywords may be used to compare with one or more keywords associated with the selected rules to produce a condition or score, which may be used to compare with a threshold value. If or when the condition applies (e.g., the score is greater than or equal to the threshold value), the attempted posting is executed (e.g., posted to the target) at block 720. If or when the condition does not apply (e.g., the score is less than the threshold value), an indication or warning may be provided to the user that the attempted post does not comply with the rule, at block 725.

In some examples, process 700 may be implemented with different, fewer, or more steps. Process 700 may be implemented as computer executable instructions, which can be stored on a medium, loaded onto one or more processors of one or more computing devices, and executed as a computer-implemented method.

Example Computing Devices and Environments

Figure 8:
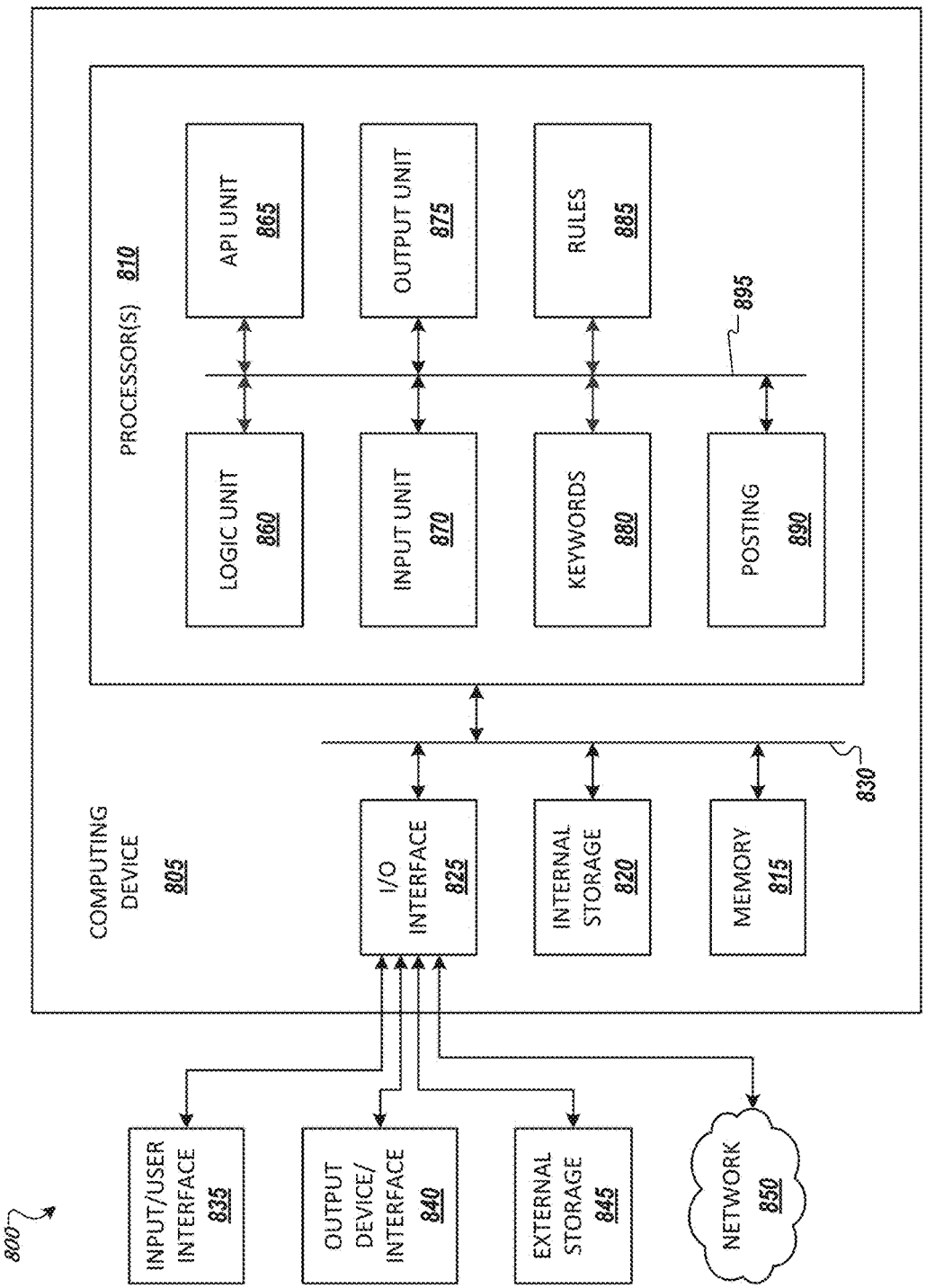
FIG. 8 shows an example computing environment with an example computing device suitable for implementing at least one example embodiment.

FIG. 8 shows an example computing environment with an example computing device suitable for implementing at least one example embodiment. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, and/or the like. In some example embodiments, input/user interface 835 and output device/interface 840 can be embedded with or physically coupled to the computing device 805. In other example embodiments, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. To implement a described embodiment, one or more applications can be deployed that include logic unit 860, application programming interface (API) unit 865, input unit 870, output unit 875, keywords unit 880, rules unit 885, posting unit 890, and inter-unit communication mechanism 895 for the different units to communicate with each other, with the OS, and with other applications (not shown). For example, one or more of keywords unit 880, rules unit 885, and posting unit 890 may implement one or more processes or data flows shown in FIGS. 2, 3A, 3B, and 7. The described units and elements can be varied in design, function, configuration, or implementation and are not limited to the descriptions provided.

In some example embodiments, when information or an execution instruction is received by API unit 865, it may be communicated to one or more other units (e.g., logic unit 860, input unit 870, output unit 875, keywords unit 880, rules unit 885, and posting unit 890). For example, after input unit 870 has detected an attempted posting from a user, input unit 870 may use API unit 865 to communicate the attempted posting to keywords unit 880 to extract or generate one or more keywords from the content of the attempted posting. Logic unit 860 may direct rules unit 885 to identify and/or select one or more rules based on the keywords or target of the attempted posting. Rules unit 885 may communicate, via API unit 865, with posting unit 890 to determine the appropriateness of the attempted posting based on the selected rules.

In some examples, logic unit 860 may be configured to control the information flow among the units and direct the services provided by API unit 865, input unit 870, output unit 875, keywords unit 880, rules unit 885, and posting unit 890 in order to implement an embodiment described above. For example, the flow of one or more processes or implementations may be controlled by logic unit 860 alone or in conjunction with API unit 865.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A method, comprising:
receiving from a user, using one or more computing devices, an indication of an attempted posting of content to a target, wherein the attempted posting of the content by the user comprises at least one item provided by the user for display;
selecting, using the one or more computing devices, a rule that associates the user with an action performed based on an existence of a condition, the rule being automatically generated based on a machine learning operation that suggests the rule to the user based on historical information associated with the user, the target and the content, the historical information identifying a correlation between the target and the content, wherein the rule is selected based on at least one of the content of the attempted posting and an identity of the target;
applying, using the one or more computing devices, the rule to the attempted posting to determine whether a condition applies, the condition relating to whether the attempted posting complies with the rule;
when the condition applies, posting to the target, using the one or more computing devices;
when the condition does not apply, providing an indication to the user that the attempted post does not comply with the rule, using the one or more computing devices;
determining that the applying the rule incorrectly determined whether the condition applies;
for the applying the rule having incorrectly determined whether the condition applies,
providing the user with an interface to fine-tune the rule based on the content of the attempted posting, wherein the providing the interface occurs after the applying, the fine-tuning comprising providing a user-generated feedback result that the rule is not acceptable, instructing the machine learning operation to automatically regenerate the rule, and modifying the machine learning operation based on the user-generated feedback result; and
providing the user with an option to update the rule to verify or correct a determination by the rule.

2. The method of claim 1, wherein the rule is generated automatically by an analysis of another content previously posted to a previous target.

3. The method of claim 2, wherein the another content comprises an image divided into a plurality of regions, and the rule is generated by image processing performed on each of the regions and analysis of the previous target and a keyword associated with a shape in the one or more regions of the image, wherein the rule is applied to determine whether the condition applies, the keyword is generated based on whether the shape in the image exists in the attempted posting, and the keyword is applied by the user fine-tuning the rule based on the content of the attempted posting.

4. The method of claim 2, wherein the another content comprises text, and the rule is generated by analysis of the previous target and a keyword extracted from the text.

5. The method of claim 2, wherein the previous target comprises the target.

6. The method of claim 1, wherein the rule is generated with at least one of a keyword provided by the user, a filtering action provided by the user, and target information provided by the user, wherein the filtering action is used to associate the keyword with the target information.

7. The method of claim 1, wherein the condition relating to whether the attempted posting complies with the rule comprises relating to whether the content complies with a keyword of the rule, or the target complies with target information of the rule, or both.

8. The method of claim 7, wherein the content complies with a keyword of the rule comprises generating or extracting another keyword from the content and comparing the another keyword with the keyword of the rule.

9. The method of claim 1, wherein the applying the rule comprises analyzing the attempted posting to generate a posting score, and the condition is based on the posting score.

10. The method of claim 1, wherein the target comprises at least one other user, the attempted posting of the content to the target comprises sharing the content with the at least one other user, and the at least one item is provided to the at least one other user.

11. The method of claim 1, wherein the content comprises at least one of an image, a video, an audio, and text.

12. A non-transitory computer readable medium having stored therein compute executable instructions for:
receiving from a user, using one or more computing devices, an indication of an attempted posting of content to a target, wherein the attempted posting of the content by the user comprises at least one item provided by the user for display;
selecting, using the one or more computing devices, a rule that associates the user with an action performed based on an existence of a condition, the rule being automatically generated based on a machine learning operation that suggests the rule to the user based on historical information associated with the user, the target and the content, the historical information identifying a correlation between the target and the content, wherein the rule is selected based on at least one of the content of the attempted posting and an identity of the target;
applying, using the one or more computing devices, the rule to the attempted posting to determine whether a condition applies, the condition relating to whether the attempted posting complies with the rule;
when the condition applies, posting to the target, using the one or more computing devices;
when the condition does not apply, providing an indication to the user that the attempted post does not comply with the rule, using the one or more computing devices;
determining that the applying the rule incorrectly determined whether the condition applies;
for the applying the rule having incorrectly determined whether the condition applies,
providing the user with an interface to fine-tune the rule based on the content of the attempted posting, wherein the providing the interface occurs after the applying, wherein the fine-tuning comprises providing a user-generated feedback result that the rule is not acceptable, instructing the machine learning operation to automatically regenerate the rule, and modifying the machine learning operation based on the user-generated feedback result; and providing the user with an option to update the rule to verify or correct a determination by the rule.

13. The computer readable medium of claim 12, wherein the content comprises at least one of an image, a video, an audio, and text.

14. The non-transitory computer readable medium of claim 12, wherein the rule is generated automatically by an analysis of another content previously posted to a previous target, and the another content comprises an image divided into a plurality of regions, and the rule is generated by image processing performed on each of the regions and analysis of the previous target and a keyword associated with a shape in the one or more regions of the image, wherein the rule is applied to determine whether the condition applies, the keyword is generated based on whether the shape in the image exists in the attempted posting, and the keyword is applied by the user fine-tuning the rule based on the content of the attempted posting.

15. At least one computing device comprising storage and at least one processor configured to perform:

receiving from a user, using one or more computing devices, an indication of an attempted posting of content to a target, wherein the attempted posting of the content by the user comprises at least one item provided by the user for display;

selecting, using the one or more computing devices, a rule that associates the user with an action performed based on an existence of a condition, the rule being automatically generated based on a machine learning operation that suggests the rule to the user based on historical information associated with the user, the target and the content, the historical information identifying a correlation between the target and the content, wherein the rule is selected based on at least one of the content of the attempted posting and an identity of the target;

applying, using the one or more computing devices, the rule to the attempted posting to determine whether a condition applies, the condition relating to whether the attempted posting complies with the rule;

when the condition applies, posting to the target, using the one or more computing devices;

when the condition does not apply, providing an indication to the user that the attempted post does not comply with the rule, using the one or more computing devices;

determining that the applying the rule incorrectly determined whether the condition applies;

for the applying the rule having incorrectly determined whether the condition applies, providing the user with an interface to fine-tune the rule based on the content of the attempted posting, wherein the providing the interface occurs after the applying, wherein the fine-tuning comprises providing a user-generated feedback result that the rule is not acceptable, instructing the machine learning operation to automatically regenerate the rule, and modifying the machine learning operation based on the user-generated feedback result; and providing the user with an option to update the rule to verify or correct a determination by the rule.

16. The at least one computing device of claim 15, wherein the rule is generated automatically by an analysis of another content previously posted to a previous target.

17. The at least one computing device of claim 15, wherein the generated with at least one of a keyword provided by the user, a filtering action provided by the user, and target information provided by the user, wherein the filtering action is used to associate the keyword with the target information.

18. The at least one computing device of claim 15, wherein the applying the rule comprises analyzing the attempted posting to generate a posting score, and the condition is based on the posting score.

19. The at least one computing device of claim 15, wherein the content comprises at least one of an image, a video, an audio and text.

* * * * *